United States Patent [19]

Thorn et al.

[11] Patent Number: 4,720,951
[45] Date of Patent: Jan. 26, 1988

[54] FRAME ASSEMBLY FOR DOORS, WINDOWS AND THE LIKE

[75] Inventors: John E. Thorn, Sylvania, Ohio; Michael L. Skidmore, Orland, Ind.

[73] Assignee: Therma-Tru Corp., Toledo, Ohio

[21] Appl. No.: 843,224

[22] Filed: Mar. 24, 1986

[51] Int. Cl.⁴ .............................................. E06B 3/00
[52] U.S. Cl. ...................................... 52/208; 52/455; 52/781; 49/DIG. 2
[58] Field of Search .................. 52/202, 203, 455–456, 52/208, 788, 789, 790, 780, 781, 765, 766, 488, 764; 49/DIG. 2

[56] References Cited

U.S. PATENT DOCUMENTS

| | | | |
|---|---|---|---|
| 3,872,198 | 3/1975 | Britton | 264/46.6 |
| 3,965,638 | 6/1976 | Newman | 52/790 |
| 3,992,843 | 11/1976 | Di Fazio | 52/790 X |
| 4,113,905 | 9/1978 | Kessler | 52/399 X |
| 4,327,535 | 5/1982 | Governale | 52/455 X |
| 4,342,144 | 8/1982 | Doguchi | 29/155 R |
| 4,383,709 | 5/1983 | Ronan | 292/346 |
| 4,383,812 | 5/1983 | Calcagni | 425/133.1 |
| 4,396,814 | 8/1983 | Miller | 200/61.43 |
| 4,416,096 | 11/1983 | Schuster et al. | 52/202 |
| 4,450,660 | 5/1984 | Dean et al. | 52/202 |
| 4,457,110 | 7/1984 | Beirnes | 49/419 |
| 4,464,874 | 8/1984 | Shea, Jr. et al. | 52/398 |

Primary Examiner—Carl D. Friedman
Attorney, Agent, or Firm—Emch, Schaffer, Schaub & Porcello

[57] ABSTRACT

An improved frame assembly for doors, windows and the like is disclosed. A frame receives a central panel which defines an edge about its exterior perimeter. The frame comprises a first and second skins in opposed relationship defining a cavity therebetween. The interior edge of the frame has internal support ribs which act in conjunction with the interior edge of the frame to grip the edge of the central panel while the exterior edges of the skins are separated by a sizable insert. The cavity between the skins is filled with a foamable insulating material which surrounds the edge of the central panel and forms a weathertight seal.

34 Claims, 5 Drawing Figures

FRAME ASSEMBLY FOR DOORS, WINDOWS AND THE LIKE

BACKGROUND OF THE INVENTION

The present invention relates to an improved frame assembly for doors, windows and the like having opposed exterior skins and a foam core. The framed material is embedded within the frame and forms a seal with the frame and the foam core. The core of the frame also has an insert about its exterior perimeter which allows for custom sizing and mounting of the assembly.

There has been an increased demand for window and door frames for new and retrofit construction with improved weather and thermal characteristics and increased durability. Doors and windows that are all wood tend to rot with time and prolonged exposure to the elements. Wood also exhibits a high degree of expansion and contraction which makes sizing and operation of the assembly difficult. Both wood and metal frames are also poor insulators when compared to certain plastics, foams and glass reinforced resin products. Prefabricated metal frames are not easily sized and therefore numerous sizes are needed if the frames are to be prefabricated or retrofitted into existing structures.

The seal between the frame and the framed material is also important to an efficient high quality door or window frame assembly. Poor seals provide inferior vapor barriers between the interior and exterior of the frame. In multiple pane windows and doors a poor seal will allow moisture to infiltrate into the spaces between the panes and condense which reduces the thermal efficiency of the assembly and makes it aesthetically unpleasing.

The size of windows and especially doors is dependent upon the overall weight of the assembly. Conventional doors and windows made of wood or metal are quite heavy and therefore require bigger and stronger hardware as well as additional structure support. Thus, the weight of the frame can be a major portion of the overall weight of the window or door and a factor in the overall size of the assembly.

Metal (steel or aluminum), thermoplastic extrusion (PVC) and wood components, used in prior art assemblies, expand and contract significantly more or less than the glass components in an assembly. Because of such differences in the coefficients of linear thermal expansion of such prior art components, it was difficult to maintain proper seals.

It is therefore an object of the present invention to provide a door and window frame assembly which is relatively lightweight and thermally efficient.

It is also an object of the present invention to provide a door and window frame assembly with an improved interface between the framed material and the frame so that the assembly is more weathertight.

It is another object of the present invention to provide a door and window frame assembly which can be easily sized to accomodate different or irregular sized openings.

It is also an object of the present invention to provide a door and window frame assembly which will readily accept different thicknesses of glass, etc. as well as multiple paned glass, etc.

It is a further object of the present invention to provide a door and window frame assembly that experiences a minimal amount of expansion and contraction due to weather change and wherein the coefficients of linear and thermal expansion of the components results in good seals.

Other objects and advantages of the present invention will become apparent from a further review of the following specification, drawings and claims.

SUMMARY OF THE INVENTION

The present assembly relates to an improved frame assembly for doors, windows, skylights and the like. The assembly consists of a central panel, such as a glass panel and a frame. The frame defines an opening for receiving the panel. The frame includes a first skin and a second skin in opposed relationship with each of the skins having an interior and exterior edge. The central panel is in contact with and held between the interior edges of the first and second skins. A cavity is defined between the first and second skins and the edge of the central panel extends into the cavity where it is supported by a plurality of staggered support ribs which depend from the skins into the cavity adjacent the interior edges of the skins. The exterior edges of the first and second skins are separated by and in contact with an insert which is sizable for custom fitting of the assembly. A foamable insulating material fills the cavity and surrounds the edge of the central panel to form a weather resistant seal between the frame and the edge of the panel. The adhesive nature of the foam core also acts to bond the entire assembly together.

When multiple sheets of glass are used, the sheets are separated by spacers which extend about the periphery of the sheets. Again the edges of the glass, as well as the spacers, extend into the cavity and the foam core surrounds the edges and spacers to seal the assembly and prevent moisture from seeping between the sheets of glass.

DESCRIPTION OF THE PREFERRED EMBODIMENT

Figure 1:
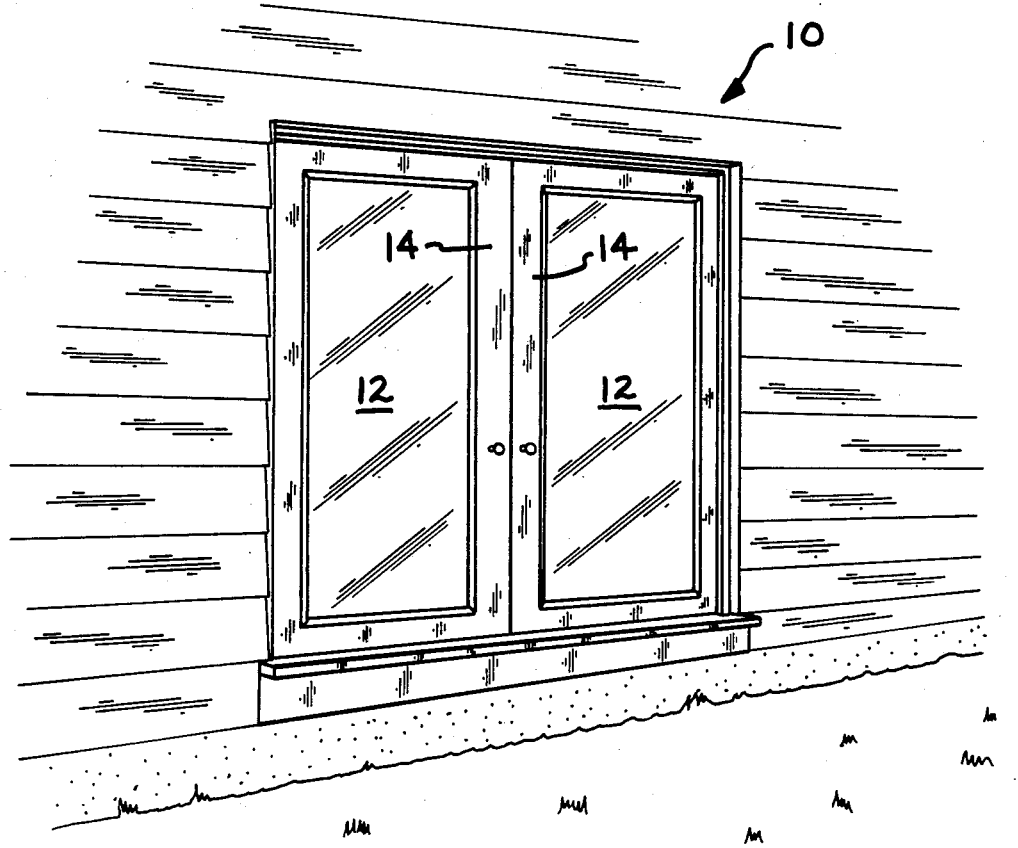
FIG. 1 is a perspective view of a door frame assembly according to the present invention.

An assembled door frame assembly embodying the present invention is shown in FIG. 1. The door frame assembly in FIG. 1 consists of a pair of patio doors which are designed to replace a sliding glass door as is commonly found in residential housing. The frame assembly is also adapted for use in window construction as can be seen in FIG. 2.

Figure 2:
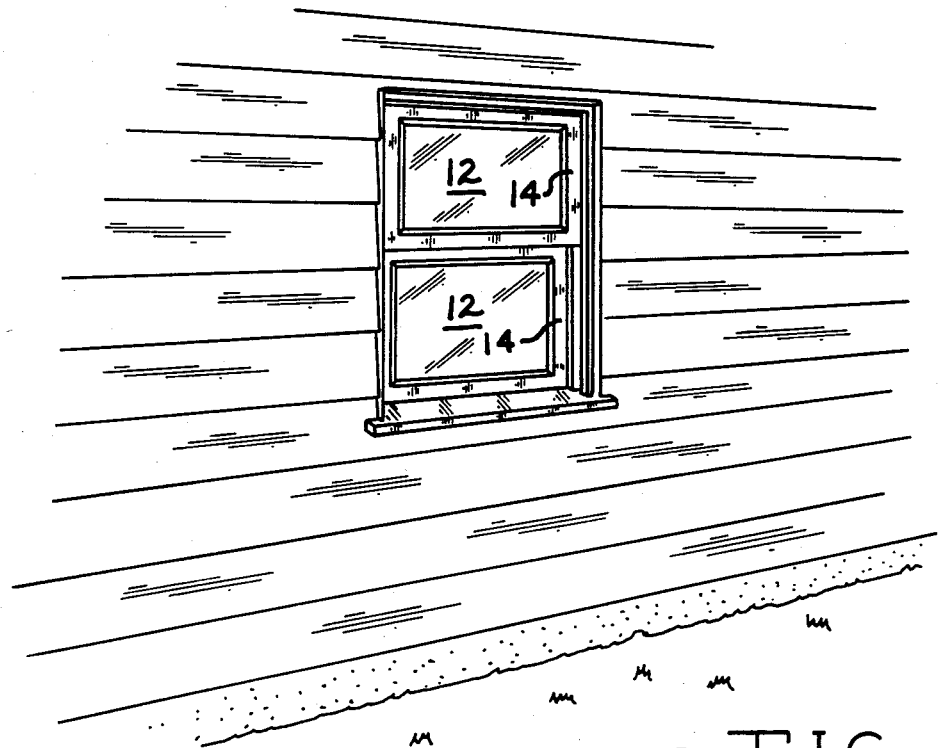
FIG. 2 is a perspective view of a window frame assembly according to the present invention.
Figure 3:
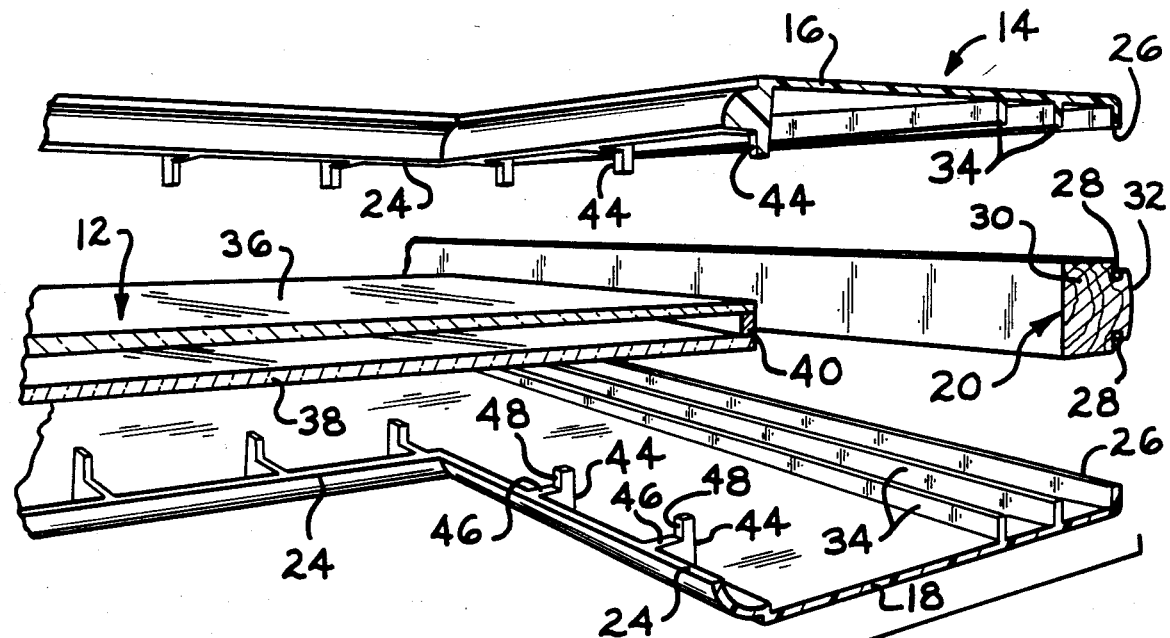
FIG. 3 is an exploded cross-sectional view of a frame assembly according to the present invention.
Figure 4:
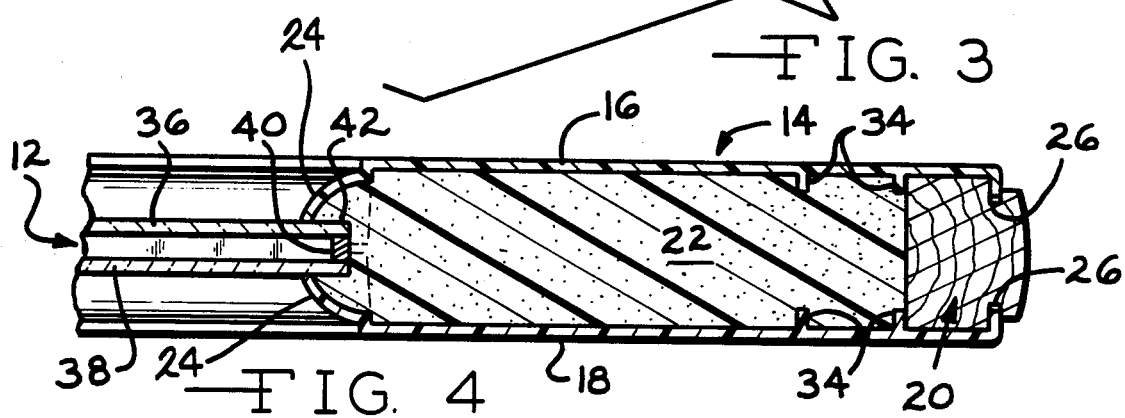
FIG. 4 is an assembled cross-sectional view of a frame assembly according to the present invention.
Figure 5:
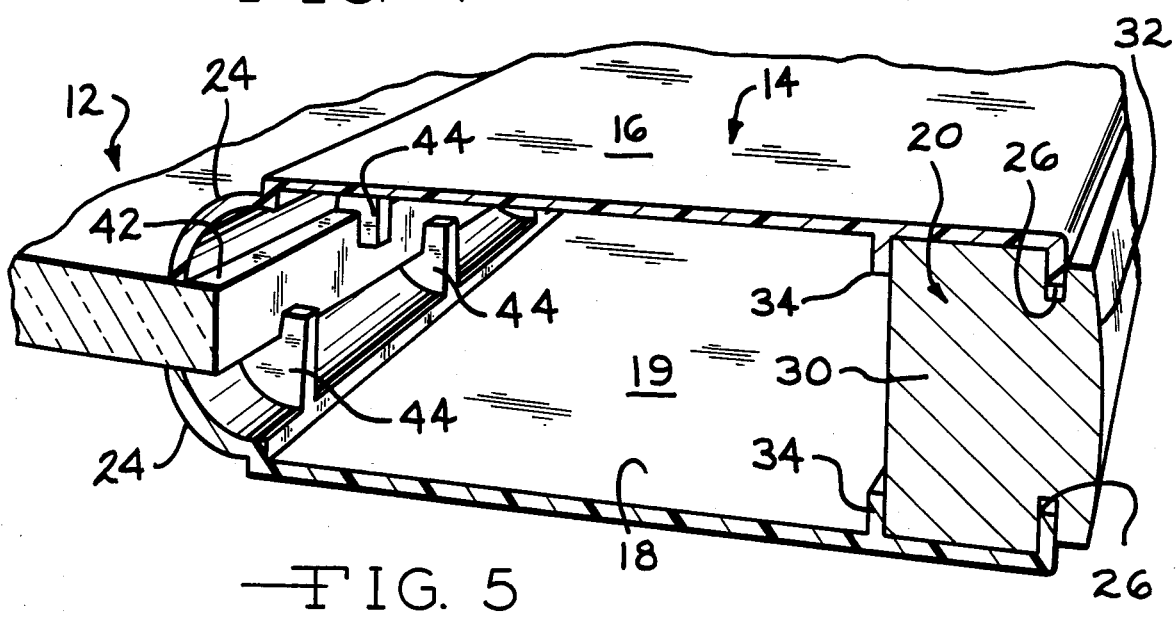
FIG. 5 is a cross-sectional view of a frame assembly according to the present invention with a single central panel.

The frame assembly 10 in FIGS. 1 and 2 consists of a central panel or glass panel 12 and a sash frame 14. The panel 12 can be a single pane as shown in FIG. 5 or a multiple pane as shown in FIGS. 3 and 4. Further, the overall shape of the frame assembly 10 can be varied to accomodate multiple panes and a wide variety of structural designs.

Referring to FIGS. 3 and 4, the frame 14 consists of a first outer skin 16, a second outer skin 18, an insert 20 and a foam-filled insulating core 22. First skin 16 and second skin 18 are in opposed relationship and serve to form a hollow cavity 19 which is filled with the foam insulating material 22. The skins 16 and 18 are molded and can be made from such materials as fiberglass reinforced plastics, pressed board, vinyl esters, polystyrenes or other moldable materials. Each of the skins 16 and 18 has an interior edge 24 which defines an opening for receiving the central panel 12. Each of the skins 16 and 18 also has an exterior edge 26 depending from the respective skins 16 and 18. In the embodiment shown is FIGS. 3 through 5, the interior edge 24 curves downwardly from the first skin 16 and second skin 18. The exterior edges 26 depend from the exterior periphery of the skins 16 and 18 in a substantially perpendicular manner.

It has been found that a fiberglass reinforced polyester has an unexpected advantage when used as a skin material. Fiberglass reinforced polyester and glass have the same coefficient of thermal expansion. Therefore, a frame assembly using a fiberglass reinforced polyester skin material performs much better sealing during cyclical variations in temperature found in parts of the United States of America and other locations throughout the world.

The insert 20 is positioned between and is in contact with the first skin 16 and the second skin 18 adjacent their exterior edges 26. As can be seen in FIGS. 3 through 5, the insert 20 has opposed grooves 28 on either side for receiving the exterior edges 26 of the first skin 16 and second skin 18. The grooves 28 separate the insert 20 into a first portion 30 which is disposed within the cavity and a second portion 32 which extends outside the cavity adjacent the exterior edges 26.

The insert 20 in the embodiment shown in the drawings extends around the entire outer periphery of the frame 14. A number of materials may be used for the insert material provided they can be easily trimmed for sizing and drilled for attachment of hardware. Examples of such materials are wood, wood fiber, thermoplastics and glass fiber reinforced thermosets. The insert 20 shown in FIGS. 3-5 is made of wood. The wood insert provides a solid surface for attaching hinges and drilling holes for door an window handle and lock assemblies. When lock assemblies and the like are to be installed in the assembly 10, the first portion 30 of the insert 20 should extend a sufficient distance into the cavity so that proper installation can be made and so that screws etc. will have a sufficient gripping surface.

For additional support for the frame assembly 10, one or more support rails 34 can be molded onto the interior of the skins 16 and 18. Two such support rails 34 are shown in FIGS. 3 and 4. One support rail 34 is shown in FIG. 5 depending from the skins 16 and 18 into the cavity 19 of the frame 14. The rails 34 shown in the drawings are parallel to one another and to the exterior edges 26. The rails 34 are also substantially perpendicular to the surface of the skins 16 and 18. As can be seen in FIG. 4, the first portion 30 of insert 20 is disposed between the exterior edges 26 of the frame 14 and a pair of the support rails 34. The support rails 34 thus perform the additional function of aligning and supporting the inserts 20.

The central panel 12 is held in place and supported by the interior edges 24 of the skins 16 and 18. Because the first and second skins 16 and 18 are separate pieces, the assembly 10 can accept single panes or multiple paned central panels 12 by simply varying the thickness of the insert 20 to match the increase or decrease in the thickness of the panes of the central panels 12. In FIG. 4 the interior edges 24 are shown contacting a double pane 12 while in FIG. 5 a single pane 12 is used.

In FIG. 3, the central panel 12 consists of a pair of parallel sheets of glass 36 and 38. The parallel sheets are separated by spacers 40 which extend around the periphery of the sheets 36 and 38. The spacer 40 may be several strips or one continuous strip of a low expansion material such as aluminum, tin, steel, rubber or thermoplastic/thermoset extrusions or pultrusions which can make uniform contact with the parallel sheets 36 and 38.

As can be seen in FIG. 4, the interior edges 24 of skins 16 and 18 contact the central panel 12 at a point interior of the edge 42. As a result, the edge 42 of the central panel 12 extends into the cavity 19 of the frame 14. Thus when the cavity 19 is filled with the foamed insulating material 22, the material 22 completely surrounds the edge 42 and forms a seal which is weather resistant and restricts heat loss. Referring again to FIG. 4, the foamed insulating material 22 also encapsulates the spacer 40 thereby further sealing the dead air space between the two sheets of glass 36 and 38. This improves the thermal barrier of the assembly 10 and also helps restrict the seapage of water vapor in between the sheets 36 and 38 which can condense and cloud the glass. The foam insulating material can be any reactive two component polymer such as polyurethane foam or polystyrene.

The edge 42 of the central panel 12 is further supported by a plurality of spaced apart support ribs 44 which are positioned within the cavity adjacent the interior edges 24. Both the first skin 16 and the second skin 18 have these support ribs 44. Referring to FIG. 5, the support ribs 44 of the first skin 16 are staggered with respect to the support ribs 44 of the second skin 18. This is to allow the insulating material 22 to completely fill the cavity of the frame 14, thereby avoiding air pockets. Placing the ribs 44 in vertical alignment tends to restrict the flow of the insulating material 22 which causes air pockets and reduces the overall insulating characteristics of the assembly 10 and the seal between the central panel 12 and the frame 14.

The support ribs 44 have a first surface 46 which is flush with the interior edge 24 of skins 16 and 18 and a second surface 48 which is substantially perpendicular to the first surface 46. The second surface 48 serves to abut the edge 42 of the central panel 12 and prevents the glass or other panel material from sliding within the frame 14 prior to the addition of the insulating material 22. The support ribs 44 shown in the present embodiment are made of fiberglass reinforced plastic and can be an integral part of the molded skins 16 and 18.

Turning to FIG. 5, there is shown another embodiment of the invention. In this embodiment the central panel 12 is a single pane of glass. Here again the same size skins 16 and 18 can be used despite the glass being a different thickness. To account for the difference in thickness, the thicknesses of the insert 20 is simply modified. For example, if the single pane of glass 12 in FIG. 5 were ¼ of an inch thinner than the overall thickness of the double panes of glass 36 and 38 and spacer 40 in FIG. 4, then the thickness of the insert 20 would be decreased the same amount. Conversely, if the pane of glass 12 was thicker, then the thickness of the insert would be increased of a proportionate amount. This means that one size of skins 16 and 18 can accommodate a varying number of thicknesses of central panels 12 by changing the size of the insert 20. In addition, because the exterior portion of the frame 14 is made of a sizable material, it can be planed, cut and drilled as necessary to properly fit a particular door, window or skylight while still having improved thermal characteristics as compared to all wood, metal and plastic frame assemblies. Finally, because the exterior skins 16 and 18 are molded, the finish, such as a pebble or woodgraining, and also the color of the surface can be imparted during the molding process.

To assemble a door or window frame assembly according to the present invention the central panel 12 is positioned within the support ribs 44 of the first skin 16 and a properly sized insert 20 is positioned about the outer periphery of the skin 16. The second skin 18 is then placed adjacent the first skin 16 so as to sandwich the central panel 12 between the edges 24 and support ribs 44 of skins 16 and 18. The cavity 19 is then filled with a foamable insulating material such that it completely fills the cavity 19 and surrounds the edge 42 of the central panel 12 thereby forming a weathertight assembly. Once the foam insulating core 22 has cured, the components of the assembly are held together by the adhesion of the foam to the interior surfaces of the skins and other components thus yielding an aesthetically pleasing, thermally efficient, weathertight door or window or sash assembly.

A decorative wood grain is normally molded on the exterior of the skins 16 and 18. This decorative wood graining is durable and may be painted or stained.

Having thus described the invention in detail it should be undertsood that various modifications and changes may be made in the invention without departing from the scope and spirit of the claims. For examples, triple or higher numbered panes may be used with multiple spacers. Other materials including transparent plastics such as plexiglas, etc., may also be used as the panel material instead of glass. In addition, opaque or translucent materials as well as reinforced materials may be used for the panel material.

Variations may also be made in the actual form of the skins and support ribs of the frame. Further, multiple smaller panes of glass, etc. separated by individual interior frames may be used instead of one large pane of glass. In such cases, each of the interior frames can employ the support ribs 44 used in conjunction with the interior edge 24 of the overall assembly 10.

We claim:

1. An improved frame assembly for doors, windows and the like comprising:
a frame defining an opening for receiving and retaining a central panel, a central panel positioned within said frame, said central panel defining an edge about its exterior perimeter, said frame including a first skin and a second skin in opposed relationship and defining a cavity therebetween, said first and second skins each having an interior and exterior edge, said central panel being in contact with and held between said interior edges of said first and second skins, said edge of said central panel extending into said cavity, said first and second skins having a plurality of support ribs positioned within said cavity and adjacent said interior edges for supporting said edge of said central panel, said support ribs having a first surface which is flush with said interior edges of said first and second skins and a second surface which is substantially perpendicular to said first surface and which abuts said edge of said central panel, an insert positioned between said first and second skins, said exterior edges of said first and second skins being separated by and in contact with said insert, said cavity containing a foamable insulating material which fills said cavity and surrounds said edge of said central panel to form a weather resistant seal between said frame and said edge of said central panel.

2. An improved frame assembly according to claim 1, wherein said insert has opposed grooves on either side for receiving said exterior edges of said first and second skins extending perpendicularly relative to the main surfaces of the skins, said opposed grooves receiving said perpendicularly extending edges.

3. An improved frame assembly according to claim 1, wherein said insert has a first portion disposed within said cavity and a second portion extending outside of said cavity adjacent said exterior edges of said first and second skins.

4. An improved frame assembly according to claim 1, wherein each of first and second skins has at least one support rail depending therefrom into said cavity.

5. An improved frame assembly according to claim 4, wherein said first portion of said insert is disposed between said support rails and said exterior edges of said first and second skins.

6. An improved frame assembly according to claim 1, wherein said exterior edges are substantially perpendicular to said first and second skins.

7. An improved frame assembly according to claim 1, wherein said central panel is a single pane of glass.

8. An improved frame assembly according to claim 1, wherein said central panel includes a plurality of spaced apart parallel sheets of glass.

9. An improved frame assembly according to claim 8, wherein said parallel sheets of glass are separated by spacers about the periphery of said sheets.

10. An improved frame assembly according to claim 9, wherein said foamable insulating material contacts said spacer to seal said central panel.

11. An improved frame assembly according to claim 1, wherein said first and second skins are constructed of fiberglass reinforced plastic.

12. An improved frame assembly according to claim 1, wherein said insert is constructed of wood.

13. An improved frame assembly according to claim 1, wherein said frame foamable insulating material is a reactive two component polymer.

14. An improved frame assembly according to claim 13, wherein said reactive two component polymer is polyurethane foam.

15. An improved frame assembly according to claim 13, wherein said reactive two component polymer is polystryene.

16. An improved frame assembly according to claim 1, wherein said ribs of said first skin are staggered with respect to said ribs of said second skin.

17. An improved frame assembly for doors, windows and the like comprising:
a frame defining an opening for receiving and retaining a central panel, a central panel positioned within said opening, said central panel defining an edge about its exterior perimeter, said frame including a first skin and a second skin in opposed relationship and defining a cavity therebetween, said first and second skins each having an interior and exterior edge and a plurality of support ribs positioned within said cavity and adjacent said interior edges for supporting said edge of said central panel, said support ribs having a first surface which is flush with said interior edges and a second surface which is substantially perpendicular to said first surface and which abuts said edge of said central panel, said support ribs of said first skin being staggered with respect to said support ribs of said second skin, said central panel being in contact with and held between said interior edges of said first and second skins, said edge of said central panel extending into said cavity, an insert adjacent the periphery of said first and second skins, said exterior edges of said first and second skins being separated by and in contact with said insert, said insert having opposed grooves on either side for receiving said exterior edges of said first and second skins, said insert further having a first portion disposed within said cavity and a second portion extending outside of said cavity adjacent said exterior edges, said cavity containing a foamable insulating material which fills said cavity and surrounds said edge of said central panel to form a weather and thermal resistant seal between said foam and said edge.

18. An improved frame assembly according to claim 17, wherein each of said first and second skins has at least one support rail depending therefrom into said cavity.

19. An improved frame assembly according to claim 18, wherein said support rails are substantially parallel to said exterior edges.

20. An improved frame assembly according to claim 18, wherein said first portion of said insert is disposed between said support rails and said exterior edges of said first and second skins.

21. An improved frame assembly according to claim 18, wherein said foamable insulating material is a reactive two component polymer.

22. An improved frame assembly according to claim 21, wherein said reactive two component polymer is polyurethane foam.

23. An improved frame assembly according to claim 21, wherein said reactive two component polymer is polystyrene.

24. An improved frame assembly according to claim 17, wherein said central panel is a single pane of glass.

25. An improved frame assembly according to claim 17, wherein said central panel is a plurality of spaced apart parallel sheets.

26. An improved frame assembly according to claim 25, wherein said parallel sheets are glass.

27. An improved frame assembly according to claim 25, wherein said parallel sheets are separated by spacers about the periphery of said sheets.

28. An improved frame assembly according to claim 27, wherein said foamable insulating material contacts said spacers to seal said central panel.

29. An improved frame assembly according to claim 27, wherein said spacers are constructed of aluminum.

30. An improved frame assembly according to claim 27, wherein said spacers are constructed of steel.

31. An improved frame assembly according to claim 27, wherein said spacers are constructed of tin.

32. An improved frame assembly according to claim 27, wherein said spacers are constructed of rubber.

33. An improved frame assembly according to claim 17, wherein said first and second skins are constructed of fiberglass reinforced plastic.

34. An improved frame assembly according to claim 17, wherein said insert is constructed of wood.

* * * * *